United States Patent
Lehmann et al.

(10) Patent No.: US 10,089,294 B2
(45) Date of Patent: Oct. 2, 2018

(54) SYSTEMS AND METHODS FOR TRACKING AND MODIFYING ACTIONS IN AN ACTION HISTORY

(71) Applicant: SAP SE, Walldorf (DE)

(72) Inventors: Claudia Lehmann, Mountain View, CA (US); Philip Tinari, Pacifica, CA (US)

(73) Assignee: SAP SE, Walldorf (DE)

( * ) Notice: Subject to any disclaimer, the term of this patent is extended or adjusted under 35 U.S.C. 154(b) by 204 days.

(21) Appl. No.: 14/984,439

(22) Filed: Dec. 30, 2015

(65) Prior Publication Data

US 2017/0192952 A1    Jul. 6, 2017

(51) Int. Cl.
  *G06F 17/00*   (2006.01)
  *G06F 17/24*   (2006.01)
  *G06F 3/0481*  (2013.01)
  *G06F 11/14*   (2006.01)

(52) U.S. Cl.
  CPC .......... *G06F 17/246* (2013.01); *G06F 3/0481* (2013.01); *G06F 11/1458* (2013.01); *G06F 17/24* (2013.01); *G06F 2201/80* (2013.01)

(58) Field of Classification Search
  CPC ............................... G06F 17/24; G06F 3/0482
  See application file for complete search history.

(56) References Cited

U.S. PATENT DOCUMENTS

| 9,208,137 | B2 | 12/2015 | Ginetti | |
|---|---|---|---|---|
| 2004/0260974 | A1* | 12/2004 | Livshits | G06F 8/71 714/19 |
| 2005/0257136 | A1* | 11/2005 | Charisius | G06Q 10/06 715/230 |
| 2006/0053126 | A1 | 3/2006 | Baca et al. | |
| 2007/0088729 | A1* | 4/2007 | Baca | G06F 9/4443 |
| 2011/0107246 | A1* | 5/2011 | Vik | G06F 3/0481 715/771 |
| 2014/0331126 | A1* | 11/2014 | Hunter | G06F 17/24 715/256 |
| 2015/0128048 | A1* | 5/2015 | Moffatt | G06F 3/04847 715/725 |
| 2016/0034134 | A1* | 2/2016 | Kritt | G06F 3/0418 345/173 |
| 2016/0057240 | A1* | 2/2016 | Straub | G06F 11/1474 709/227 |

OTHER PUBLICATIONS

U.S. Appl. No. 14/701,369, filed Apr. 30, 2015.

* cited by examiner

*Primary Examiner* — Amelia Tapp
(74) *Attorney, Agent, or Firm* — Brake Hughes Bellermann LLP

(57) ABSTRACT

A computer-implemented method for generating an updated action history for display in a graphical user interface. The method may include identifying a last matching action between two action histories, disabling a subset of actions in an action history, inserting, subsequent to the last matching action in an updated action history, an action corresponding to user-triggered input, enabling a subset of actions in the updated action history that are listed in the action history after the last matching action and displaying the updated action history in the graphical user interface, the updated action history including one or more indications for each of the actions associated with inserting the action corresponding to the user-triggered input.

20 Claims, 10 Drawing Sheets

FIG. 6A

- Add Formula Column
  Column Name: FULL NAME
  Author: TESTER (Thu, Sep 3, 2015, 12:04)

Change Case on FULL NAME
  Lower
  Author: TESTER (Thu, Sep 3, 2015, 12:04)

- To String on DATE
  Author: TESTER (Thu, Sep 3, 2015, 14:36)

Split on DATE
  Split String "-" New columns DATE1, DATE2
  Author: TESTER (Thu, Sep 3, 2015, 14:37)

- Cleanse Worksheet
  Author: TESTER (Thu, Sep 3, 2015, 12:12)

Match Records in Worksheet
  Author: TESTER (Thu, Sep 3, 2015, 12:12)

*606*

SYSTEMS AND METHODS FOR TRACKING AND MODIFYING ACTIONS IN AN ACTION HISTORY

TECHNICAL FIELD

This description relates to software, computer systems, and computer implemented methods for tracking and modifying actions applied to shared datasets.

BACKGROUND

Typically, transactional databases and other forms of data repositories can be used to capture high speed transactional and operational data, such as ticket sales, parts inventories, and the like. The transactional databases may operate on logical units of work (e.g., "transactions") that contain one or more SQL statements, for example, which may be operated to read, write, or update data. To gain access to spreadsheets of transactional data for analysis purposes, the data is typically moved from the spreadsheets and transactional databases to an analytic database, where business users can generate user-specific queries to derive meaning and business intelligence from the data.

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method that includes obtaining an action history that includes a plurality of actions that correspond to manipulating data. The actions may be stored in chronological time order. The method may include generating an updated action history in response to receiving a user-triggered input to perform an action on the data. The updated action history may include the action history modified by the action corresponding to the user-triggered input. The updated action history may be generated by identifying a last matching action between the action history and the updated action history, disabling a subset of actions in the action history that are listed in the action history after the last matching action, inserting, subsequent to the last matching action in the updated action history, the action corresponding to the user-triggered input, and enabling a subset of actions in the updated action history that are listed in the action history after the last matching action The method may also include displaying the updated action history in a graphical user interface. The updated action history may include one or more indications for each of the actions associated with inserting the action corresponding to the user-triggered input.

Implementations can include one or more of the following features, alone or in combination with one or more other features. For example, enabling a subset of actions in the updated action history may include analyzing all actions in the updated action history in a time-consecutive order from newest action to oldest action to verify the subset of actions in the updated action history. Enabling the subset of actions in the updated action history may also include in response to validating that the subset of actions, when performed in combination, generate valid data, marking the subset of actions in the updated action history as active, re-applying the subset of actions in the updated action history to the data, and displaying the updated action history in the user interface with updated graphical information. The updated graphical information may indicate that the subset of actions are to be performed on the data.

Implementations can include one or more of the following features, alone or in combination with one or more other features. For example, the method may include generating modified data based on the updated action history. The generation may include automatically producing a data flow graph according to the updated action history, executing the data flow graph, wherein the data flow graph retrieves the data and the updated action history, and displaying the modified data to the user in the graphical user interface.

Implementations can include one or more of the following features, alone or in combination with one or more other features. For example, the method can include disabling a subset of actions in the action history that are listed subsequent to the last matching action by applying an inactive label to at least one action in the subset of actions in the action history, and removing changes executed on data associated with the at least one action.

Implementations can include one or more of the following features, alone or in combination with one or more other features. For example, the method may include in response to determining that the user-triggered input to perform an action on the data includes a deletion request, removing from the action history, at least one action based on the user-triggered input, and reverting the data to a prior version of the data.

Implementations can include one or more of the following features, alone or in combination with one or more other features. For example, the method may include in response to determining that the user-triggered input to perform an action on the data includes a reorder request, generating an additional update to the updated action history to modify a chronological position of at least one action in the action history, and executing the action history including the additional update to generate modified data according to the reorder request.

According to another general aspect, a system may include a display, a memory including executable instructions, and a processor operably coupled to the memory and configured to execute the executable instructions. The executable instructions may cause the system to obtain an action history that includes a plurality of actions that correspond to manipulating data. The actions may be stored in chronological time order. The executable instructions may include generating an updated action history in response to receiving a user-triggered input to perform an action on the data. The updated action history may include the action history modified by the action corresponding to the user-triggered input. The updated action history may be generated by identifying a last matching action between the action history and the updated action history, disabling a subset of actions in the action history that are listed in the action history after the last matching action, inserting, subsequent to the last matching action in the updated action history, the action corresponding to the user-triggered input, and enabling a subset of actions in the updated action history that are listed in the action history after the last matching action The executable instructions may also include displaying the updated action history in a graphical user interface. The updated action history may include one or more indications for each of the actions associated with inserting the action corresponding to the user-triggered input.

Implementations can include one or more of the following features, alone or in combination with one or more other features. For example, enabling a subset of actions in the updated action history may include analyzing all actions in the updated action history in a time-consecutive order from newest action to oldest action to verify the subset of actions in the updated action history. Enabling the subset of actions in the updated action history may also include in response to validating that the subset of actions, when performed in combination, generate valid data, marking the subset of actions in the updated action history as active, re-applying the subset of actions in the updated action history to the data, and displaying the updated action history in the user interface with updated graphical information. The updated graphical information may indicate that the subset of actions are to be performed on the data.

Implementations can include one or more of the following features, alone or in combination with one or more other features. For example, the executable instructions may include generating modified data based on the updated action history. The generation may include automatically producing a data flow graph according to the updated action history, executing the data flow graph, wherein the data flow graph retrieves the data and the updated action history, and displaying the modified data to the user in the graphical user interface.

Implementations can include one or more of the following features, alone or in combination with one or more other features. For example, the executable instructions can include disabling a subset of actions in the action history that are listed subsequent to the last matching action by applying an inactive label to at least one action in the subset of actions in the action history, and removing changes executed on data associated with the at least one action.

Implementations can include one or more of the following features, alone or in combination with one or more other features. For example, the executable instructions may include in response to determining that the user-triggered input to perform an action on the data includes a deletion request, removing from the action history, at least one action based on the user-triggered input and reverting the data to a prior version of the data.

Implementations can include one or more of the following features, alone or in combination with one or more other features. For example, the executable instructions may include in response to determining that the user-triggered input to perform an action on the data includes a reorder request, generating an additional update to the updated action history to modify a chronological position of at least one action in the action history, and executing the action history including the additional update to generate modified data according to the reorder request.

In another general aspect, a non-transitory computer-readable storage medium having recorded and stored thereon instructions that, when executed, perform actions of receiving, at a user interface, a plurality of user-triggered inputs to perform a plurality of operations on a spreadsheet including data. The plurality of operations may correspond to a manipulation of the data. The instructions may include tracking and storing the plurality of operations in an operation history data structure associated with the spreadsheet. The tracking may include generating a time-ordered list corresponding to a timestamp associated with each of the plurality of operations. The instructions may include displaying, in the user interface, a list of the plurality of operations and providing a plurality of selectable controls in the user interface, the selectable controls configured to modify the operation history. The instructions may include receiving an indication to modify the operation history and automatically generating an updated operation history according to the indication. The instructions may include in response to detecting one or more incompatibilities between operations in the updated operation history, restoring a valid state of the data and operation history. The instructions may include displaying indications of the one or more incompatibilities in the updated operation history, and at least one valid version of the operation history in the user interface.

Implementations can include one or more of the following features, alone or in combination with one or more other features. For example, the instructions may be further configured to in response to determining that the updated operation history is valid, automatically generate a data flow graph according to the updated operation history, execute the data flow graph, wherein the data flow graph retrieves the data and retrieves the updated operation history, and display modified data to the user in the spreadsheet in the user interface. The modified data may be based at least in part on the updated operation history.

Implementations can include one or more of the following features, alone or in combination with one or more other features. For example, the instructions may include displaying indications of the one or more incompatibilities in the user interface that includes providing a plurality of operations to correct the one or more incompatibilities in the updated operation history, the plurality of selectable controls being configured to modify portions of the updated operation history.

Implementations can include one or more of the following features, alone or in combination with one or more other features. For example, the instructions may include having the plurality of selectable controls including a change case control, a trim, control, a replace control, a fill control, a combine control, a merge values control, a split control, a convert to number control, a convert to date control, a duplicate control, a rename control, a clear control, a formula control, a formula control, a cleanse worksheet control, and a remove control.

Implementations can include one or more of the following features, alone or in combination with one or more other features. For example, the instructions may be configured to automatically validate the updated operation history using data in the operation history.

Implementations can include one or more of the following features, alone or in combination with one or more other features. For example, the instructions may include having an updated operation history that includes a plurality of user-defined operations and the user-defined operations are inserted into the updated operation history before being executed on the data.

Implementations can include one or more of the following features, alone or in combination with one or more other features. For example, the instructions may include having the indication to modify the operation history include an input that includes a request to reorder an operation history and at least two operations to be reordered. In response to receiving the input, the instructions can be configured to identify one or more operations in the operation history that are listed between the at least two operations, disable the one or more operations that are listed between the at least two operations. The instructions may also include inserting one of the at least two operations to be reordered before the disabled one or more operations and inserting another of the at least two operations to be reordered after the disabled one or more operations and executing a validity check to determine whether the at least two operations being reordered within the operation history violates data dependencies. The instructions may also include in response to passing the validity check, generating a new operation history that includes the at least two operations reordered according to the input, and enabling the disabled operations in the new operation history.

Implementations can include one or more of the following features, alone or in combination with one or more other features. For example, the instructions may be further configured to carry out, in response to failing the validity check, a reverting of a version of the operation history without performing the request to reorder the operation history and display of the reverted version of the operation history in the user interface. Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

FIGS. 6A-6C are example screenshots illustrating validation of an action history.

DETAILED DESCRIPTION

Figure 1:
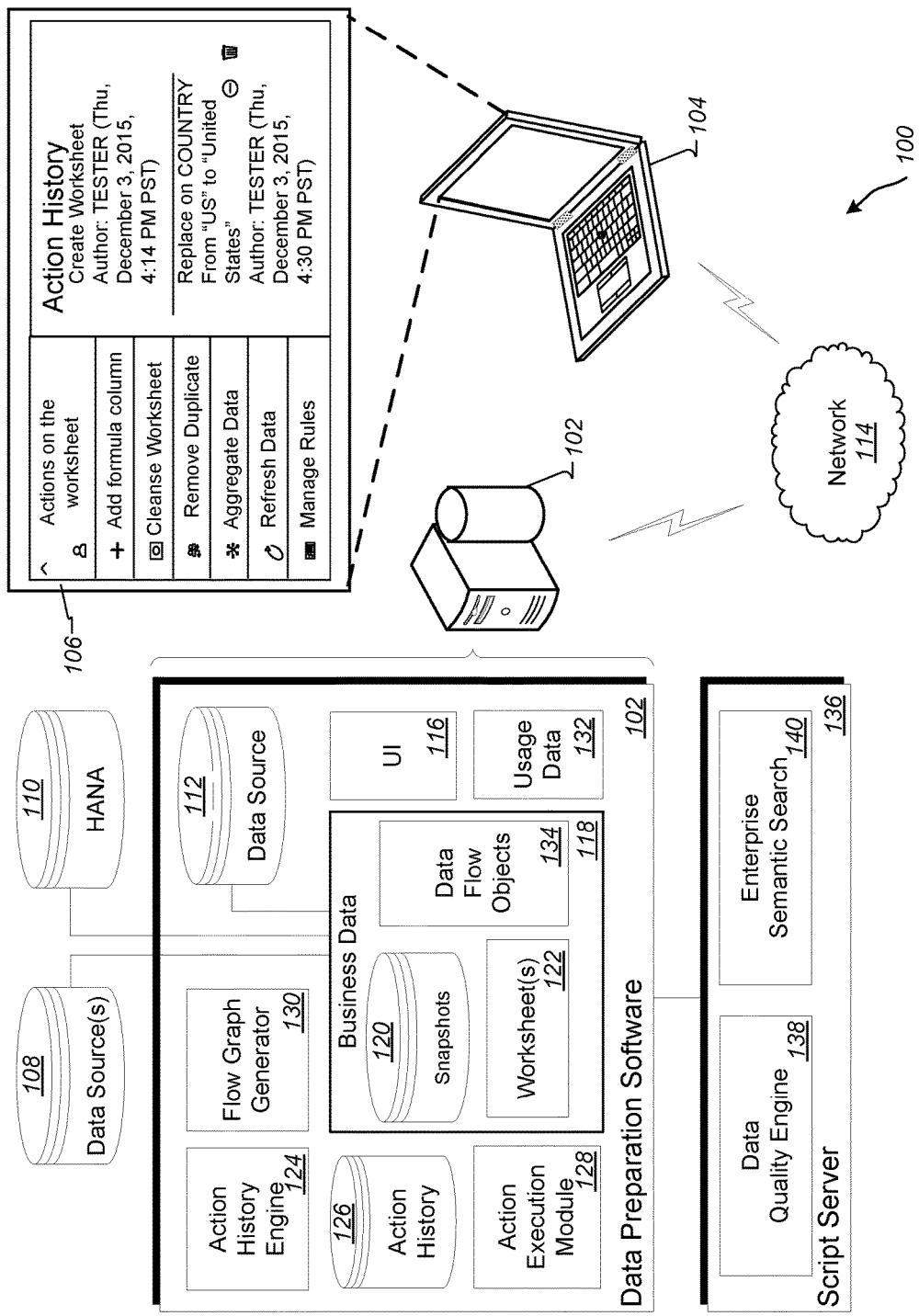
FIG. 1 illustrates a block diagram of an example system for tracking, modifying, and executing actions in an action history.

Data preparation software can empower business analysts to discover, prepare, and share local and enterprise datasets. A dataset can include one or more database tables or a database views in a data repository (e.g., HANA or another remote source), an Excel® worksheet in an Excel® file, or a comma-separated value (CSV) file, just to name a few examples. Structurally, a dataset may include one or more fields, (e.g., columns) and one or more records (e.g., rows). The data preparation software described herein can be used to allow business users to access datasets to manipulate data for purposes of redefining information governance, usage monitoring, and automation of data preparation.

At a high level, this document describes systems and techniques to track and modify manipulations (e.g., actions) performed on data. The actions may be triggered for execution by user-entered requests. The executed actions can be tracked and stored in one or more action histories. An action history may pertain to a detailed log of stored actions that can be applied to particular stored data. In some implementations, the action history may include actions that have already been executed against the data. In other implementations, the action history may include actions that have yet to be executed on the data. Action histories can be accessed for a first set of data and the actions and details in the action history can be applied to a second set of data. For example, an action history for the first set of data can be accessed as a starting point for the second set of data. A user can modify the action history and apply the modified action history to the second set of data. This may provide the advantage of allowing the user to begin with a history of actions that are valid and applicable to the data.

Throughout a data preparation process, business users/analysts may apply a set of actions to particular data. Such actions are typically performed in a user-selected order. Typically, each action can be undone or redone by the user in the order that they are applied. As such, if the user wishes to undo a selected action in the middle of an action history, each action after the selected action may be undone or cancelled. Undoing or cancelling a number of items from an action history will ensure that the user will have to recreate the undone or cancelled actions, should the user wish to execute such actions. If the user wishes to make additional adjustments beyond modifying the last action performed (e.g., undo, redo, etc.) the user may do so using the systems and methods described herein.

Allowing the users to modify an existing list of actions (i.e., action histories) can provide the advantage of allowing multiple users to simultaneously work on the same data. In addition, allowing users to modify action histories beyond the last entered action can provide the advantage of incorporating modifications within and throughout the action history without the task of recreating particular actions in the action histories. Namely, the user can compile a set of actions by beginning from an existing action history and can update portions of the action history to carry out data preparation and data manipulation tasks.

Compiling a set of actions can include a user (e.g., business analysts, business users, developers, etc.) accessing actions stored in an action history to generate new action histories, modify stored data associated with other action histories, or to correct existing action histories. In a non-limiting example, when a user manipulates data in a spreadsheet (i.e., in a user interface), the user's manipulation may trigger actions that cause the data to be modified. The triggered actions can be stored in the action history and the same user (or another user) can access the action history to modify the data according to stored or modified actions.

In some implementations, the order of execution of actions on the data may be modified, which may allow the stored actions to be performed in a new, updated order. In some implementations, the actions can be enabled or disabled in particular action histories. In some implementations, the actions can be inserted, removed, and/or edited throughout an action history. Changes to an action history can be validated and the actions in the history can be executed against stored data, according to the systems and methods described herein.

FIG. 1 illustrates a block diagram of an example system 100 for tracking and modifying actions in an action history. Features and advantages of the present disclosure may include a computer system that allows business users to access and manipulate actions performed on transactional data directly without having to carry out complex and burdensome data preparation. For example, embodiments of the disclosure may allow business users with little or no IT experience to access a number of data sources directly from local computers and networks to view actions performed against such data. Upon viewing the actions, business users may use data preparation software 102 to modify actions, reorder actions, add and remove actions, and to perform other operations on the actions, as described in detail below.

In general, a business user may log into data preparation software 102 using a system 104 via example interface 106. The data preparation software 102, which allows the user to browse data sources 108, HANA data source 110, and data source 112 directly and/or across one or more networks 114 to browse additional data sources. The user can access data preparation software 102 to connect to one or more of the data sources, retrieve data, and manipulate the data, action histories, and particular actions performed (or to be performed) on the data. The user can access and manipulate such data using example interface 106 by means of user interface component 116. User interface component 116 can provide interactive content, data, and screens to a business user accessing interface 106, for example.

In some implementations, the business user may use interface 106 to perform high level manipulations on spreadsheet data, for example, to generate reports or conduct data analysis. On the backend of the user interface 106, a computer system executing data preparation software 102 may automatically translate user-entered high level manipulations to produce complex data flow graphs to retrieve, transform, and store the data. Such data flow graphs may be generated from stored action history information. The user can use access, track, and modify such action history information using interface 106, for example.

Data preparation software 102 may execute on one or more hardware server computers, for example, which may reside in a data center such as a local or cloud computing system. Local computer 104 may communicate with the data preparation software 102 over a variety of data communication networks. The data preparation software 102 may communicate with data sources 108-112 across one or more of the same or different data communication networks, for example.

Data sources 108-112 may include databases, spreadsheets, comma separated value files, or a variety of other types of structured data sources, for example. With the addition of an unstructured or semi-structured to structured converter, data sources 108-112 may also include unstructured or semi-structured data sources, for example. Structured data typically refers to data that is organized according to a defined pattern, such as a table of columns and rows. Unstructured or semi-structured data may refer to data that has no structure, varying structure, or limited patterns, not including tables of defined column fields and rows of records, for example.

The data preparation software 102 includes a repository 118 for storing data and business data from data sources 108 and 110 locally. Repository 118 may include a snapshots repository 120 and/or other local or remote connectable databases as well as local in-memory storage, or other type of data storage mechanism for storing data. In some implementations, data preparation software 102 can include virtual tables that establish links to particular remote data sources, for example, and particular tables and columns and other connectivity information to quickly and efficiently retrieve particular data sets from particular remote sources that have been selected by a user for retrieval within data preparation software 102.

Features and advantages of the present disclosure include a data source browser that allows a business user, with very little knowledge of network administration, to browse data sources across a wide range of networks, for example, to access data and track and modify actions associated with data. The tracking and modification of actions associated with the data can enable the business user to quickly apply updates to data and tables of data.

In operation of system 100, a business user may use interface 106 to customize data. For example, the business user can select data from data sources 108-112 (or other data) and can trigger data preparation software 102 to retrieve the data using device 104, for example. The retrieved data can be stored locally. In some implementations, data selected by the user and retrieved by data preparation software 102 is stored as snapshot data locally in snapshot repository 120, for example.

Original versions of snapshot data may be provided as input to a transformation engine (not shown) to produce modified data sets (or modified action histories) that are highly customized by the business analyst. Original snapshots of data from a variety of data sources 108-112 may be refreshed quickly and seamlessly in an automated manner using virtual tables to connect to and retrieve the original data sets in case such original data has changed. As described in more detail below, a business analyst may manipulate data using accessed data and action histories pertaining to such data. The retrieval, transformation, and updating processes may happen automatically or with minimal input from the user, eliminating the need for IT personnel with advanced network administration skills.

The data preparation software 102 may further include worksheets 122 which can be used to maintain information about particular worksheets (i.e., spreadsheets) being manipulated by each user. As used herein, a spreadsheet represents a presentation of data in columns and rows and is referred to herein interchangeably as a worksheet.

In some implementations, system 100 includes an action history engine 124 that tracks and modifies action histories 126 and performs validation of action histories 126. The action history engine 124 may track actions triggered by user manipulations of data within worksheets 122, for example. An action execution module 128 can carry out the actions in the action histories 126.

In general, manipulations (i.e., actions, operations, execution, etc.) on the data can be tracked and stored in an action history 126. The actions can be applied to documents (e.g., worksheets, spreadsheets, etc.) based on user action/input, user inaction, rule-based software, and or other triggers that indicate actions are to be performed when the data meets particular threshold criteria. The user configuring such actions can define multiple operations in a row before applying the modifications to a document associated with the action history 126. In some implementations, after applying the modifications to the action history 126, the updated document may be generated and a corresponding action history may be updated and displayed to the user. In the event that an error occurs while applying the modifications to the action history, a previous state of the document including the action history, may be automatically restored.

The manipulations/actions can include, but are not limited to enable operations, disable operations, delete operations, reorder operations, and edit operations. Document creation may be the first listed action in an action history. The document creation action indicates creation of the particular document (e.g., worksheet, spreadsheet, etc.). In some implementations, undoing an action in the action history may automatically undo all succeeding actions. This may cause actions that appear subsequent to the action to be undone to be deleted.

The redo operation may include configuring an action in an action history to be re-performed. For example, the result of a redo operation may include re-performing a particular action on a document or data in the document. An undo operation may include removing manipulations applied to a document or data in the document.

The enable operation may include enabling an action in an action history that has been disabled previously. The enable operation may mark the action as active and when the operation is triggered, the action is reapplied to data in a document, for example. The disable operation may include disabling an action in an action history by marking the action as inactive and reverting an applied change to the data in a document. Although an action may be disabled, it may still be shown in the action history with altered appearance. For example, disabled actions may be grayed, lightened, color-coded, shrunk, collapsed, or other visual indication noting that the operation will not be carried out.

The delete operation may include removing an action from an action history and reverting any changes to the data in a document. In some implementations, deleting an action may remove the ability to restore the action. This may force a user to recreate the action to recover functionality with in the operation/action.

The reorder operation may include changing a position of an action in an action history. When the reorder operation is applied to the action history and the action history is executed, actual changes in the data may appear different depending on the previous and following actions around the reordered action(s).

The edit operation may modify a configuration for an action and may revert changes to data within a document to an old configuration. Editing the configuration of an operation can range from simple to more complex changes. One example for a simple change may include accessing an action history that includes a formula such as Replace on COUNTRY from "US" to "United States." If the user wishes to modify/correct the replacement string, the user may edit this action and set the updated replacement string to "United States of America." By contrast, without the edit operation, the user would have two options: (1) disable or delete the current replace action and define a new replace action with the correct replacement string; In addition, the new replace action would likely have to be moved to the right position (i.e., where the old replace action was) or (2) define a new, additional replace action that replaces "United States" with "United States of America." The new, additional replace action would likely have to be moved to the right position (i.e., right after the old replace action).

One example for a complex change may include generating/accessing an action history with an action that may perform a cleanse on person related data (e.g., first name, last name, title, etc.). If the user wishes to extend the cleanse action by also cleansing address data, the user may edit the existing cleanse action and include address related data (street, zip code, city, etc.). Without the edit operation, the user would have again two options: (1) disable or delete the existing cleanse action and define a new cleanse action that acts on both, person and address data; Again, the new cleanse action may have to be moved to the right position (i.e., where the old cleanse action was) or (2) define a second cleanse for the address columns and move it to the right position (i.e., right after the first cleanse action).

In operation of system 100, a user may perform a number of document (e.g., spreadsheet) manipulations. The manipulations can trigger changes to the data within the spreadsheet. The user can view the data with and without particular manipulations using the action history. For example, the user may be presented with the action history that houses a list of actions that have been performed in response to manipulations by the user, and the user may select one or more actions to be moved ahead of three other actions. The system can automatically present the user with the spreadsheet data as it would have been had the moved action been performed before the other three actions. In particular, if the three actions were intended to operation on a first column of data and the move action were configured to move data from the first column to a fourth column in the spreadsheet, then the three actions may operate on the first column (now without the moved data) and thus the moved data will remain intact and not be operated upon by the three actions.

If the user desires to return to any one of the later states after particular manipulations have been performed on the spreadsheet data, the user may simply select, via a user interface generated by user interface 116 (or other user interface) to restore or remove particular actions. The system 100 automatically reproduces the data or dataset with the resorted or removed actions as they were before the transformation process imposed by the user. The data preparation software 102 can execute the restored action history from action history repository 126 or execute the update action history, based on the user input.

In some implementations, system 100 may include a flow graph generator 130 that generates data flow graphs based on the actions triggered by a user's manipulation of the spreadsheet. For example, a data flow graph may include a number of data flow objects 134 that each correspond to some low level operation on the data. Data flow objects 134 may include a read object to read particular data, a write object to write a data output, projection, union, join, match, cleanse, best record, or geocode, just to name a few examples. The data flow objects 134 may include metadata that describes particular data operations and may include parameters for configuring specific instances of the data operations, for example. The data flow objects 134 may be selected and arranged automatically by flow graph generator 130, for example, based on high level spreadsheet manipulation or actions and coupled together to form a data flow graph.

The action execution module 128 may retrieve a particular data flow graph and/or data from repositories 108, 110, 112 and/or 122. The retrieved data and graphs can be used to execute data flow operations based on the order and connectivity in the data flow graph. Accordingly, the high level spreadsheet manipulations performed by the user may be translated into system actions, which may be used to automatically produce customized data flow graphs that configure the action execution module 128 to receive snapshot data 120 from remote data sources 108 or 110 and to produce modified datasets that are customized directly by the business analyst without time consuming and complicated support by IT staffing and network administration. This may provide the advantage of a fast and efficient data analysis paradigm without having highly trained IT and network administration specialists prepare remote data.

In a non-limiting example, as a user performs each manipulation on a spreadsheet, each corresponding action may be stored in the action history repository 126. The system 100 may use the action history engine 124 to omit one or more data flow objects 134 from a data flow graph and return particular data flow objects to the data flow graph. Accordingly, if actions are undone, corresponding data flow objects may be removed from the data flow graph and the action execution module 128 may produce data results as if one or more manipulations had not occurred. If the undone actions are restored by the user, corresponding data flow objects may be returned to the data flow graph and the action execution module 128 may produce data results that include the user's manipulations. Accordingly, a user may perform a set of manipulations and walk backward in time to view previous results that omit the manipulations. A user may decide to reintroduce one or more of the omitted manipulations simply by selecting menu items. The action tracking, data flow graph generation, and transformation of the selected snapshot datasets into modified datasets may all be handled automatically by system 100.

Referring again to FIG. 1, the system 100 may also include a usage data module 132. The usage data module 132 may include usage statistics that may allow IT staff and/or network administration to monitor usage statistics of system 100. Examples of statistics, mechanisms for capturing such statistics, and data structures for storing such statistics can be captured and used to generate data for users.

In some implementations, the data preparation software 102 can communicate with or has access to a script server 136. The script server may be one of the HANA database servers. The script server 136 may be used to execute application function libraries. Application functions may be called from outside the system 100 to perform data intensive and complex operations (such as data quality actions).

The script server 136 includes a data quality engine 138 and an enterprise semantic search engine 140. The data preparation software 102 can use the data quality engine to execute data quality actions (e.g., cleansing and removing duplicate records) on a document (e.g., worksheet). After execution, these actions may be listed in the action history. The data quality actions (cleansing and removing duplicate records) may request identified content types.

The data preparation software 102 can use the enterprise semantic search engine 140 to search data sources to find local files or tables based on their names or their content and to identify content types of columns during data acquisition.

In some implementations, one or more additional servers and one or more computer-readable storage devices can communicate with data preparation software 102 and/or system 136 using network 114 to provide business content and services to the client device 104. In some implementations, the network 114 can be a public communications network (e.g., the Internet, cellular data network, dialup modems over a telephone network) or a private communications network (e.g., private LAN, leased lines). In some implementations, the computing devices shown here can communicate with the network 114 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

Although only two computing devices are depicted in FIG. 1, the example system 100 may include a plurality of computing devices that can exchange data over a network 114 (or additional networks not shown). The computing devices 102 and 104 may represent clients or servers and can communicate via network 114, or other network. Example client devices may include a mobile device, an electronic tablet, a laptop, or other such electronic device that may be used to access business content from system 102. Each client device 104 can include one or more processors and one or more memory devices. The client devices 104 can execute a client operating system and one or more client applications that can access, control, and/or display business data on a display device included in each respective device. The data preparation software 102 may represent a server device. In general, the system 102 may include any number of repositories storing content and/or business software modules that can be accessed to generate business logic in a scripting language.

Additional devices are possible and such devices may be configured to be substituted for one another. In some implementations, the data preparation software 102 and system 104 can be laptop or desktop computers, smartphones, personal digital assistants, portable media players, tablet computers, gaming devices, or other appropriate computing devices that can communicate, using the network 114, with other computing devices or computer systems.

Figure 2:
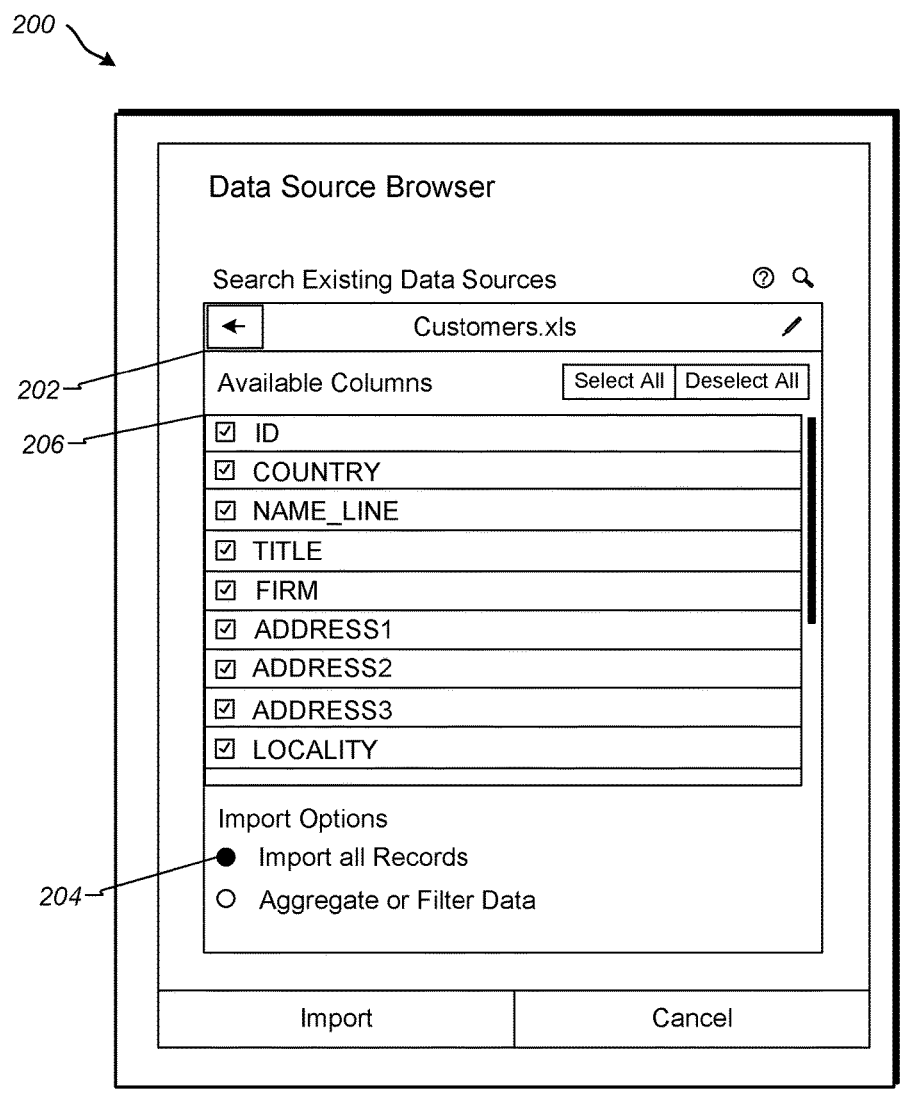
FIG. 2 is an example screenshot of a data source browser in a data preparation application.

FIG. 2 is an example screenshot of a data source browser 200 in a data preparation application. Users can access data source browser 200 to import datasets into the data preparation software 102. Before using the imported datasets, users create a project and import one or more datasets into a worksheet. A project represents a collection of worksheets that can be created by one user and shared with other users. Next, the data values in one or more fields, or the entire worksheet can be manipulated. Manipulations can range from simple data preparation actions, such as the conversion of string values to lower case, to complex actions, such as the removal of duplicate records.

As shown in FIG. 2, the user has generated a "Customers.xls" worksheet 202 and begins to search for existing data sources. In the depicted example, the user is choosing to import all records (indicated by radio dial 204) that contain selected columns 206. The columns 206 include an ID, COUNTRY, NAME$_{13}$LINE TITLE, FIRM, ADDRESS1, ADDRESS2, ADDRESS3, and LOCALITY data. Since generating the worksheet and importing data pertain to actions, each of these are tracked and logged in the action history. In general, each data preparation action is tracked in an action history. For each action, a description of the action may be shown to the user. In addition, the owner of the action and the timestamp when the action was applied may also be shown.

Figure 3:
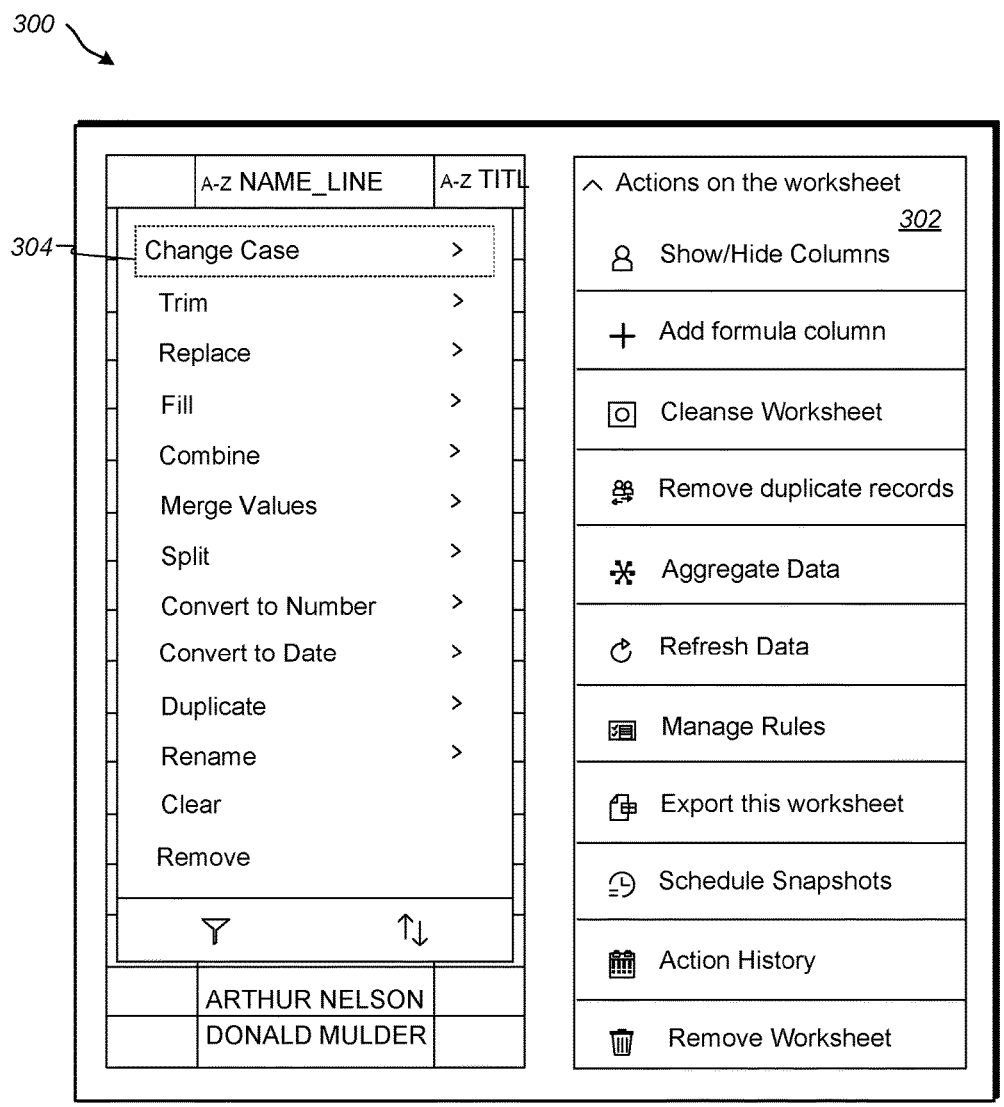
FIG. 3 is an example screenshot of a user interface to modify and prepare data.

FIG. 3 is an example screenshot of a user interface 300 to modify and prepare data. After the spreadsheet is generated and the data is uploaded, the user may assign data values in one or more fields, or the entire spreadsheet can be manipulated to modify data values in one or more fields.

In this example, the user can choose to change the case of data, trim, replace, fill, combine, merge, split, convert, duplicate, rename, clear, and/or remove particular data. In addition, the user can perform actions 304 on a selected spreadsheet. For example, the user can show/hide columns, add/formula to a column, cleanse a spreadsheet, remove duplicate records, aggregate data, refresh data, manage formulas, export a spreadsheet, schedule snapshots, review the action history, and remove the spreadsheet. Here, the user has chosen to change a case 304.

Figure 4:
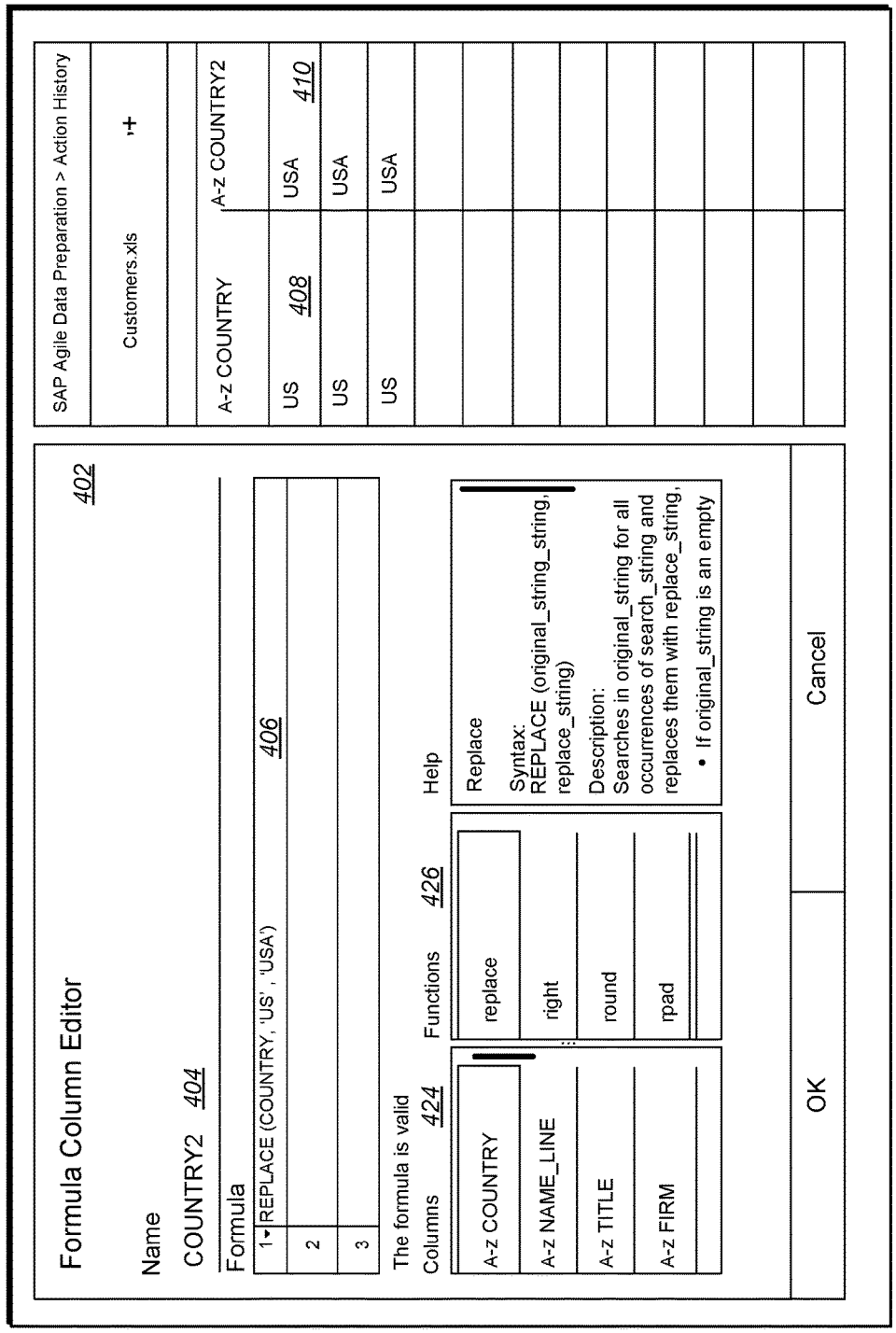
FIG. 4 is an example screenshot of a user interface to generate formulas for manipulating data.

FIG. 4 is an example screenshot of a user interface 400 to generate formulas for manipulating data. Here, the user can configure formulas (e.g., an expression) which may be used to generate a new column with particular calculated data. Such formulas can be used to generate actions to be performed on the data. The actions can be stored in an action history.

As shown in FIG. 4, the user has created a customized formula for a column in spreadsheet "Customers.xls" using a formula column editor 402. The user has named the formula "Country2" 404 and has indicated that columns with the value "US" should be replaced with the full country name of "USA," as shown by formula 406. The update has been added to data preparation steps for the spreadsheet shown at listings 408 and 410. Similarly, other action histories may include modifications for other country name changes. For example, the user may indicate that columns with the value "FR" should be replaced with the full country name of "France." In a similar fashion, the user may indicate that columns with the value "DE" should be replaced with the full country name of "Germany. Such formulas may be used to generate separate action histories/listings pertaining to data affected by those country names. Other actions can be added and applied.

The formulas can be generated by the user by selecting columns 424 and functions 426 to apply to the data. With each entry, the system 100 can perform a validation step on information entered into interface 400. When a valid formula is entered, a new column representing the formula is created in the spreadsheet. If the formula references other columns in the spreadsheet, then transformations on those columns will be reflected in the formula column.

Figure 5:
FIG. 5 is an example screenshot of a user interface for accessing and modifying an action history.

FIG. 5 is an example screenshot of a user interface 500 for accessing and modifying an action history. Each data preparation action can be tracked and depicted in an action history 502. As shown here, a first action 504 in an action history 502 marks the creation of the spreadsheet (e.g., spreadsheet). A spreadsheet can be created in various ways. For example, a spreadsheet can be created by importing a dataset, combining two spreadsheets (through merge or append), or aggregating a spreadsheet and storing the result in a new spreadsheet.

For each action shown in action history 502, details about the action are depicted. For example, an owner (i.e., author), a description of the action, and a timestamp of when the action was applied are all depicted in the action history 502.

As shown in FIG. 5, the first action 504 includes a "Create Worksheet" action by author "TESTER" that was created according to the timestamp "Thu, Dec. 3, 2015 at 4:14 PM PST." A second action 506 is shown pertaining to the actions in FIG. 4. Here, the action 506 includes a "Replace on COUNTRY" action from "US" to "United States," with author "TESTER" and timestamp "Thu, Dec. 3, 2015, 4:10 PM PST." Similarly, a third action 508 includes a "Replace on COUNTRY" action from "DE" to "Germany," with author "TESTER" and timestamp "Thu, Dec. 3, 2015, 4:30 PM PST." In addition, a fourth action 510, a fifth action 512 and a sixth action 514 include actions to rename a user name, remove a column, and trim on a region, respectively. Actions can be deleted using each corresponding icon 516 and disable/enable using each corresponding icon 518. Additional actions can be applied to the spreadsheet using actions 520, as described in detail throughout this disclosure.

FIGS. 6A-6C are example screenshots illustrating validation of an action history. In general, actions in an action history may be dependent on each other. For example, a first action may indicate that another action should be executed before execution of the first action. Such dependencies can be validated using system 100 to guarantee that the modifications to the action history results in a valid spreadsheet. The following figures depict example violations that may occur.

FIG. 6A illustrates a column mismatch 602 in which an action is applied on a column that does not exist anymore or does not exist yet. In the depicted example, the formula column "FULL NAME" is created and then its case is changed to lowercase. Removing the action that creates the formula column invalidates the change case action.

FIG. 6B illustrates a data type mismatch 604 in which an action is applied on a column with an incompatible data type. In one example, a user may attempt to perform a data refinement, but the data type of a column may not be compatible. In the depicted example, the column "DATE" is converted into a text column and then split into year, month, and day. Without the data type conversion, the split action is not applicable.

FIG. 6C illustrates a configuration mismatch 606 in which an action is applied with an incompatible configuration. Here, a spreadsheet is cleansed and matched. The configuration of the match operation was built based on the previous cleanse action and becomes invalid when the cleanse action is removed.

Figure 7:
FIG. 7 is an example screenshot illustrating modification of actions in an action history.

FIG. 7 is an example screenshot of a user interface 700 illustrating modification of actions in an action history. In general, the action history 702 can be modified using the following operations: disabling, enabling, removing, reordering and editing. A first action 704 marks creation of the spreadsheet and is typically fixed and unchangeable. A second action 706 indicates replacement of "US" in a country filed to the term "United States." The action 706 is italicized to indicate that the action was disabled. A pen shape 708 may, for example, be shown to indicate that the position of the action has changed and/or to indicate that the action has been disabled or enabled. In general, the pen shape 708 may be applied to a particular action to indicate the action has been modified in some way. The third action 710 indicates a rename action on data. A fourth action 712 is a remove column action. The action 712 is raised to indicate that the user is currently making edits to the action 712. A fifth action 714 is shown with a trash can symbol 715 indicating that the action to trim based on region will be removed from the action history when the user applies all actions. Other notations can be used including color coding, rule-based coding, sunken components, raised components, indentations, etc.

After applying the modifications, the user can select apply 716 to update the action history 702 and the corresponding spreadsheet of data (not shown) based on the action history 702. In some implementations, the user may select an export data control 718 to export all saved data in the action history to a corresponding spreadsheet of data. In particular, exporting data causes one or more data flow graphs to be generated.

Export data control 718 can be selected by a user to export the updated action history 700 to a data flow graph. Here, the user can select control 718 to export the action history 700 to a data flow graph. A data flow graph may include interchangeable design time objects stored in the HANA repository. It can be consumed as an executable runtime object, for example, by a HANA application such as data preparation software 102. A flow graph may represent a set of data preparation actions on certain datasets. The flow graph can include operations definitions, inputs in which to act upon, and outputs produced by carrying out actions. In general, data preparation actions available in data preparation software 102 can be mapped to operations in a flow graph.

The export operation can ensure that users can access action histories created and modified by other users. In addition, the export operation can provide an advantage of allowing the same user to reuse action histories on data that is not necessarily related or connected to a particular action history. For example, if an action history is set up to reorder specific non-essential tasks in one dataset, the same actions in the action history may apply to another dataset. The user can then reuse the action history to execute editing or other data manipulations to the other data set.

Figure 8:
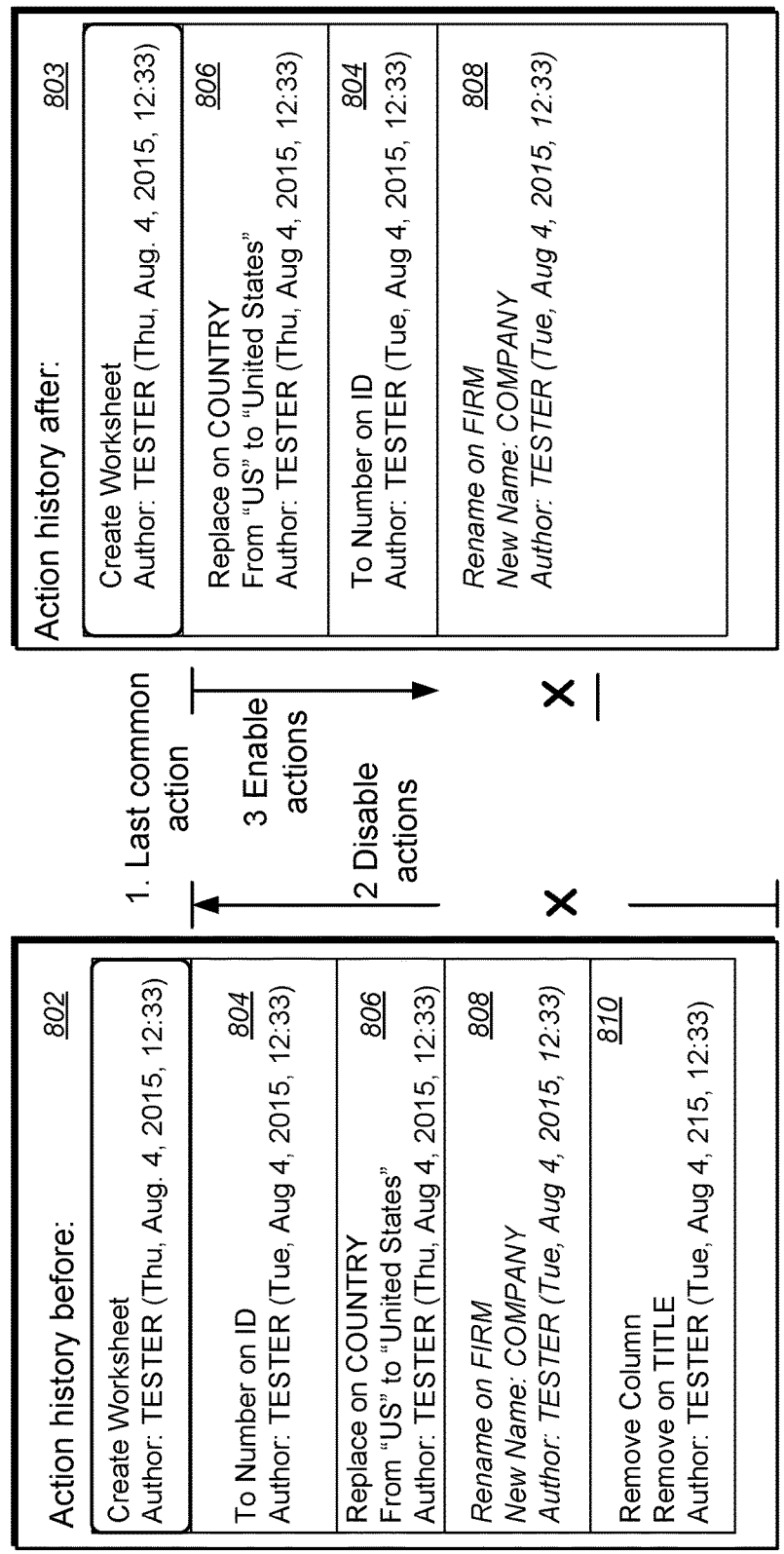
FIG. 8 is an example of updating an action history.

FIG. 8 is an example of updating an action history. In particular, an action history 802 illustrates a before state while an action history 803 illustrates an after state. In the action history 802, after creating the spreadsheet, a second action 804 converts the data type of a column ID from text to a number, and a third action 806 replaces the value "US" with "United States" in the column "COUNTRY." A fourth action 808 renames the column "FIRM" to "COMPANY." Finally, a fifth action 810 removes the column "TITLE."

In this example, the user had previously disabled the rename action 808. The rename action 808 is shown italicized indicating that the action 808 is inactive/disabled. Accordingly, the disable actions step, when performed can skip the disabling of the inactive action 808 or any other inactive action because the disabling would be redundant.

The updated action history 803 includes the switching of actions 806 and 804. The updated action history 803 also removed action 810 and indicated a rename had been performed, as shown by the italicized text. Accordingly, the user can carry out the changes to the action history 802 using the user interfaces described throughout this disclosure. The system 100 can implement the following logic showing how the action history will appear before and after the above-described changes are executed. Code snippet I refers to a before state of the action history, while code snippet II refers to an after state of the action history.

| Code Snippet I |
|---|
| "actionState": [<br>{ "key": "AddDataset", "active": true },<br>{ "key": "tonumber", "columnId": 1, "active": true },<br>{ "key": "replace", "columnId": 2, "active": true },<br>{ "key": "rename", "columnId": 3, "active": false },<br>{ "key": "remove", "columnId": 4, "active": true }<br>] |

| Code Snippet II |
|---|
| "actionState": [<br>{ "key": "AddDataset", "active": true },<br>{ "key": "replace", "columnId": 2, "active": true },<br>{ "key": "tonumber", "columnId": 1, "active": true },<br>{ "key": "rename", "columnId": 3, "active": false },<br>{ "key": "remove", "columnId": 4, "active": true, "deleted": true }<br>] |

The system 100 can apply the user-triggered modifications by executing the modifications of the action history 802 on the actual corresponding spreadsheet by carrying out the following algorithm. First, the system 100 can compare a prior (e.g., older) action history with the modified (e.g., new) action history 803 to find the last common action. The system 100 can then disable all actions from the old action history after the last common action. Analysis can include beginning at a bottom to the top of the action history in which the action history is listed in a chronological time order from earliest action (e.g., top) to the latest action (e.g., bottom). The system 100 can skip actions that were already disabled in the action history 802, for example.

Upon disabling, the system 100 can enable all actions from the new action history 803 after the last common action going from top to bottom of the new action history 803, where the action history 803 is listed in a chronological time order from earliest action (e.g., top) to the latest action (e.g., bottom). The system 100 can skip actions that have been disabled and/or deleted.

The process, in effect, moves backward through a known error free action history 802, disables content so that errors are not flagged during user-modification of the action history 802. Then, the process moves forward to recreate (i.e., enable) actions. In the event that an invalid action may cause an error, the system 100 can flag such invalid actions so that the user can correct the errors. In some implementations, the system 100 may revert the action history 803 to a prior action history (e.g., history 802) in the event that carrying out action history 803 would cause data inconsistencies.

Figure 9:
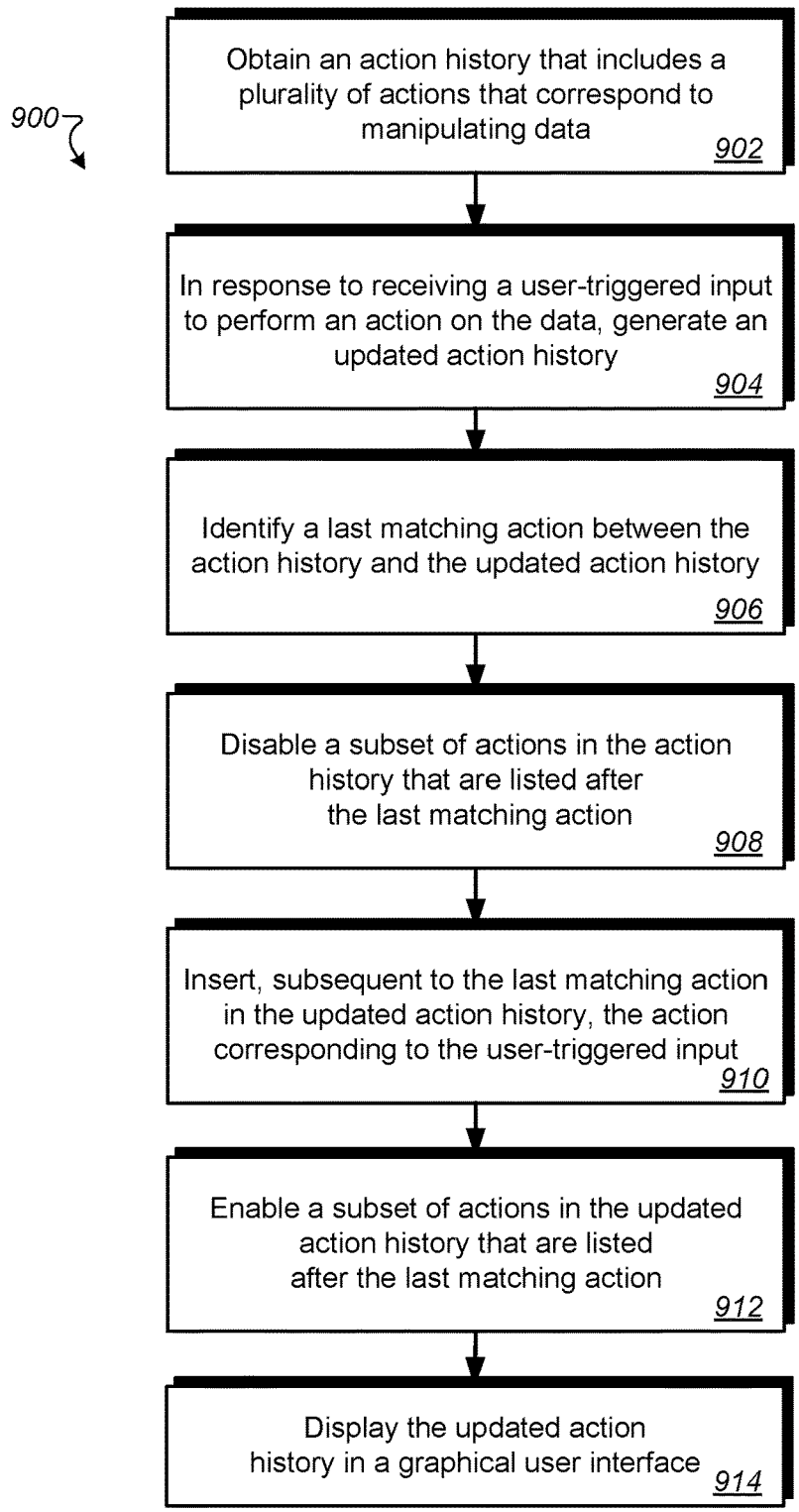
FIG. 9 is a flowchart illustrating example operations of the system of FIG. 1.

Referring to FIG. 9, an exemplary flowchart illustrates a process 900 for implementing the system of FIG. 1. The process 900 may be described with respect to systems, modules, and examples described throughout this disclosure. The process 900 can be performed, for example, by data preparation software 102. Process 900 includes, at step 902, obtaining an action history that includes a number of actions that correspond to manipulating data. The actions may be stored in chronological time order. For example, an action history can be retrieved from action history repository 126. The action history 124 may list a number of actions that can be performed on various datasets retrieved from repositories 108, 110, and/or 112.

In response to receiving a user-triggered input to perform an action on the data, the process 900 includes generating an updated action history, at step 904. The updated action history may include the action history (e.g., action history 802) modified by the action corresponding to the user-triggered input to generate an updated action history (e.g., action history 803). The updated action history may be generated by identifying a last matching action between the action history (e.g., action history 802) and the updated action history (e.g., action history 803), at step 906. The last matching action may pertain to a last matching action between two action histories. Matching actions between two action histories typically have the same action identifier and may be at the same position in the action histories.

At step 908, generating the updated action history may also include disabling a subset of actions in the action history (e.g., action history 802) that are listed in the action history after the last matching action. The disabling may include applying an inactive label to at least one action in the subset of actions in the action history (e.g., action history 802) and removing changes executed on data associated with the at least one action.

At step 910, the process 900 includes inserting, subsequent to the matching action in the updated action history, the action corresponding to the user-triggered input. For example, the data preparation software 102 may insert the action into the updated action history 803 after the last matching action.

At step 912, the process 900 includes enabling a subset of actions in the updated action history. This subset of actions may be listed in the action history after the last matching action. In particular, enabling a subset of actions in the updated action history includes analyzing one or more actions in the updated action history in a time-consecutive order from newest action to oldest action to verify the subset of actions in the updated action history. In response to validating that the subset of actions, when performed in combination, generate valid data, the enabling can further include marking the subset of actions in the updated action history as active and re-applying the subset of actions in the updated action history to the data. The enabling can further include displaying the updated action history in the user interface with updated graphical information. The updated graphical information may indicate that the subset of actions are to be performed on the data.

The process 900 also include displaying the updated action history in a graphical user interface at step 914. The updated action history may include one or more indications for each of the actions associated with inserting the action corresponding to the user-triggered input, the disabling, and the enabling.

In some implementations, the process 900 also includes generating modified data based on the updated action history. Generating the modified data may include automatically producing a data flow graph according to the updated action history. The data flow graph may include data flow objects that detail how to carry out particular actions on spreadsheet data, for example. The process 900 may also include executing the data flow graph in which the data flow graph retrieves the data and the updated action history and carries out the actions indicated by the data flow objects on the data. The process 900 may then display the modified data to the user in the graphical user interface.

In some implementations, the process 900 may include carrying out instructions related to determining that the user-triggered input to perform an action on the data includes a deletion request, removing from the action history, at least one action based on the user-triggered input and reverting the data to a prior version of the data.

In some implementations, the process 900 includes carrying out instructions related to determining that the user-triggered input to perform an action on the data includes a reorder request. If the reorder request is indicated, the process 900 may include generating an additional update to the updated action history to modify a chronological position of at least one action in the action history and executing the action history including the additional update to generate modified data according to the reorder request.

Figure 10:
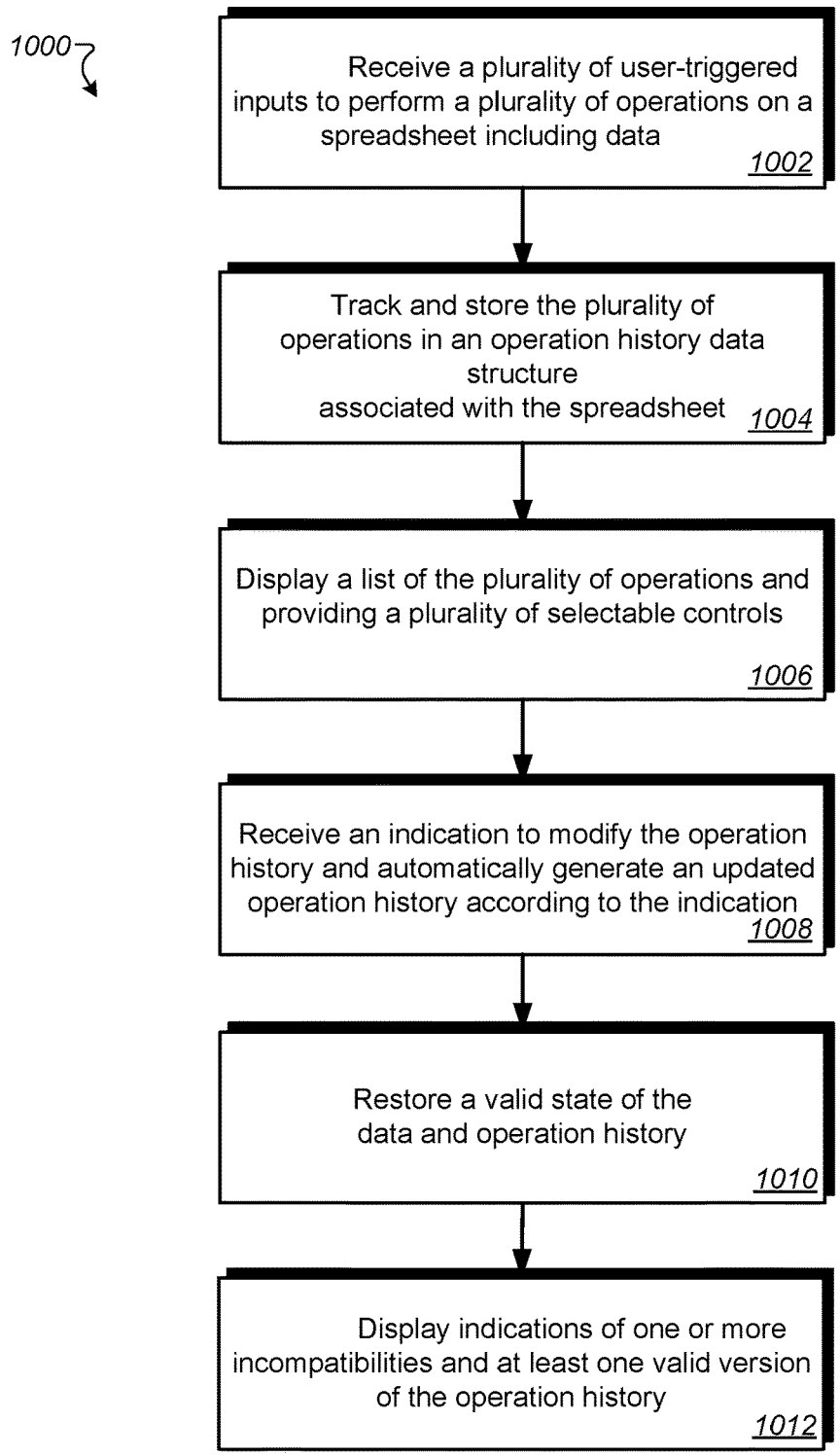
FIG. 10 is a flowchart illustrating example operations of the system of FIG. 1.

Referring to FIG. 10, an exemplary flowchart illustrates a process 1000 for implementing the system of FIG. 1. The process 1000 may be described with respect to systems, modules, and examples described throughout this disclosure. The process 1000 can be performed, for example, by data preparation software 102. Process 1000 performs a computer-implemented method for tracking and modifying operations applied to data corresponding to a data preparation application. The process 1000 includes receiving, at a user interface, a plurality of user-triggered inputs to perform a plurality of operations on a spreadsheet including data, at step 1002. The plurality of operations may correspond to a manipulation of the data. The manipulation of the data may include, as described above, disabling, enabling, deleting, reordering, editing, etc.

In some implementations, the process may include tracking and storing the plurality of operations in an operation history data structure associated with the spreadsheet, at step 1004. The tracking may include generating a time-ordered list corresponding to a timestamp associated with each of the plurality of operations.

The process 1000 includes displaying, in the user interface, a list of the plurality of operations and providing a plurality of selectable controls in the user interface, at step 1006. The selectable controls may be configured to modify the operation history. For example, the set of controls may include edit buttons, delete buttons, move up or move down indicators, and the like, so that a user can access to modify the actions in the operation history.

The process 1000 includes receiving an indication to modify the operation history and automatically generating an updated operation history according to the indication, at step 1008. The process 1000 includes actions pertaining to detecting one or more incompatibilities between operations in the updated operation history in order to restore a valid state of the data and operation history, at step 1010.

The process 1000 includes displaying indications of the one or more incompatibilities and at least one valid version of the operation history in the user interface, at step 1012. For example, the indications for incompatible actions may be depicted with different colors, fonts, or symbols than compatible actions in an operation history.

In some implementations, the process 1000 includes determining that the updated operation history is valid, and automatically generating a data flow graph according to the updated operation history. In addition, the process 1000 may include executing the data flow graph. The data flow graph can then retrieve the data and the updated operation history. Upon execution of the data flow graph, the process 1000 may include displaying modified data to the user in the spreadsheet in the user interface. The modified data may be based at least in part on the updated operation history. In some implementations, the process 1000 may include automatically validating the updated operation history using data in the operation history. In some implementations, the updated operation history includes a plurality of user-defined operations and the user-defined operations are inserted into the updated operation history before being executed on the data.

In some implementations, displaying indications of the one or more incompatibilities in the user interface includes providing a plurality of operations to correct the one or more incompatibilities in the updated operation history, the plurality of selectable controls to modify portions of the updated operation history. Example selectable controls may include a change case control, a trim, control, a replace control, a fill control, a combine control, a merge values control, a split control, a convert to number control, a convert to date control, a duplicate control, a rename control, a clear control, a formula control, a formula control, a cleanse worksheet control, and a remove control.

In some implementations, the indication to modify the operation history includes an input that includes a request to reorder an operation history and at least two operations to be reordered. In response to receiving the input, the process 1000 may include identifying one or more operations in the operation history that are listed between the at least two operations, disabling the one or more operations that are listed between the at least two operations, inserting one of the at least two operations to be reordered before the disabled operations and inserting another of the at least two operations to be reordered after the disabled operations, and executing a validity check to determine whether the at least two operations being reordered within the operation history violates data dependencies. In response to passing the validity check, the process 1000 may include generating a new operation history that includes the at least two operations reordered according to the input and enabling the disabled one or more operations in the new operation history. In response to failing the validity check, the process 1000 may include reverting to a version of the operation history without performing the request to reorder the operation history and displaying the reverted version of the operation history in the user interface.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Business logic and business applications described herein may include any type of business application (e.g., a software application including business logic for accounting, customer relationship management, human resource management systems, outsourcing relationship management, field service software, enterprise resource planning, enterprise resource management (ERM), enterprise content management (ECM), business process management (BPM) and product lifecycle management, etc.). The business application may be hosted on one or more servers in a networked computer system in a server-client configuration. A user may interact with or operate the business application via the client computing device (e.g., a laptop computer, desktop computer, a smartphone, a handheld computing device, etc.). A backend of the business application (e.g., "server application") may run on the server side to hold and process data, which may be obtained, for example, from one or more server-side databases or other network sources. A front end of the business application (or "client application") may run on the client computing device and provide a user interface of the business application on the client computing device.

A server application can be implemented on any of the devices shown in FIG. 1. The server application may include "data tables," "data structures" or "data sources," which contain data or links to the data processed or generated by the server application. The data sources may include data of any of a variety of data types (e.g., integers, Booleans, characters, floating-point numbers, complex numbers, text, alphanumeric strings, arrays, matrices, combination data types, etc.).

The server application may include access or links to dynamic data sources on the server (i.e. sources containing data which is updated or refreshed during application runtime). A client application (or other user-application) running on a client computing device may be configured to present or display data retrieved from the data sources of the server application on the user interface (e.g., on a display screen) of the client device. Further, non-browser based applications may include static data, which is defined development time. Data from static data sources (e.g., predefined text used with labels and buttons) may be loaded on the user interface during development time, while the data from dynamic data sources (e.g. a field in a database used with edit boxes or combo boxes) may be loaded during runtime.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method comprising:
obtaining a first action history that includes a plurality of actions that correspond to manipulating data, the plurality of actions being stored in chronological time order;
in response to receiving a user-triggered input to perform an action on the data, generating a second action history that includes the plurality of actions from the first action history modified by the action corresponding to the user-triggered input,
wherein the second action history is updated by, comparing the plurality of actions from the first action history to the plurality of actions in the second action history to identify a last matching action between the first action history and the second action history;

disabling a subset of actions in the first action history that are listed after the last matching action;

inserting, subsequent to the last matching action in the second action history, the action corresponding to the user-triggered input;

enabling a subset of actions in the second action history that are listed after the last matching action to generate an updated second action history; and displaying the updated second action history in a graphical user interface, the updated second action history including one or more indications for each of the actions associated with inserting the action corresponding to the user-triggered input.

2. The method of claim 1, wherein enabling a subset of actions in the second action history includes:

analyzing all actions in the second action history in a time-consecutive order from newest action to oldest action to verify the subset of actions in the second action history;

in response to validating that the subset of actions, when performed in combination, generate valid data, marking the subset of actions in the second action history as active;

re-applying the subset of actions in the second action history to the data; and displaying the second action history in the user interface with updated graphical information, the updated graphical information indicating that the subset of actions are to be performed on the data.

3. The method of claim 1, further comprising generating modified data based on the updated second action history, the generation of the modified data including:

automatically producing a data flow graph according to the updated second action history;

executing the data flow graph, wherein the data flow graph retrieves the data and the updated second action history; and displaying the modified data to the user in the graphical user interface.

4. The method of claim 1, wherein disabling a subset of actions in the first action history that are listed subsequent to the last matching action includes:

applying an inactive label to at least one action in the subset of actions in the first action history; and removing changes executed on data associated with the at least one action.

5. The method of claim 1 further comprising, in response to determining that the user-triggered input to perform an action on the data includes a deletion request, removing from the first action history, at least one action based on the user-triggered input and reverting the data to a prior version of the data.

6. The method of claim 1, further comprising, in response to determining that the user-triggered input to perform an action on the data includes a reorder request:

generating an update to the second action history to modify a chronological position of at least one action in the second action history; and executing the second action history including the update to generate modified data according to the reorder request.

7. The method of claim 1, wherein the action corresponding to the user-triggered input includes multiple sequential operations for modifying a document associated with the first action history.

8. A system comprising:

a display;

a memory including executable instructions; and a processor operably coupled to the memory and configured to execute the executable instructions to cause the system to:

obtain a first action history that includes a plurality of actions that correspond to manipulating data, the plurality of actions being stored in chronological time order;

in response to receiving a user-triggered input to perform an action on the data, generate a second action history that includes the plurality of actions from the first action history modified by the action corresponding to the user-triggered input, wherein the second action history is updated by, comparing the plurality of actions from the first action history to the plurality of actions in the second action history to identify a last matching action between the first action history and the second action history;

disabling a subset of actions in the first action history that are listed after the last matching action;

inserting, subsequent to the last matching action in the second action history, the action corresponding to the user-triggered input;

enabling a subset of actions in the second action history that are listed after the last matching action to generate an updated second action history; and displaying the updated second action history in a graphical user interface, the updated second action history including one or more indications for each of the actions associated with inserting the action corresponding to the user-triggered input.

9. The system of claim 8, wherein enabling a subset of actions in the updated action history includes:

analyzing one or more actions in the second action history in a time-consecutive order from newest action to oldest action to verify the subset of actions in the second action history;

in response to validating that the subset of actions, when performed in combination, generate valid data, marking the subset of actions in the second action history as active;

re-applying the subset of actions in the second action history to the data; and displaying the second action history in the user interface with updated graphical information, the updated graphical information indicating that the subset of actions are to be performed on the data.

10. The system of claim 8, wherein the processor is further configured to execute the instructions to cause the system to generate modified data based on the updated second action history, the generation of the modified data including:

automatically producing a data flow graph according to the updated second action history;

executing the data flow graph, wherein the data flow graph retrieves the data and the updated second action history; and displaying the modified data to the user in the graphical user interface.

11. The system of claim 8, wherein disabling a subset of actions in the first action history that are listed subsequent to the last matching action includes:
    applying an inactive label to at least one action in the subset of actions in the first action history; and
    removing changes executed on data associated with the at least one action.

12. The system of claim 8, wherein the processor is further configured to execute the instructions to cause the system to,
    in response to determining that the user-triggered input to perform an action on the data includes a deletion request, removing from the first action history, at least one action based on the user-triggered input and reverting the data to a prior version of the data.

13. The system of claim 8, wherein the processor is further configured to execute the instructions to cause the system to,
    in response to determining that the user-triggered input to perform an action on the data includes a reorder request:
        generating an update to the second action history to modify a chronological position of at least one action in the second action history; and
        executing the second action history including the update to generate modified data according to the reorder request.

14. The system of claim 8, wherein the action corresponding to the user-triggered input includes multiple sequential operations for modifying a document associated with the first action history.

15. A computer program product including instructions recorded on a non-transitory computer readable storage medium and configured, when executed by at least one processor, to cause the at least one processor to:
    obtain a first action history that includes a plurality of actions that correspond to manipulating data, the plurality of actions being stored in chronological time order;
    in response to receiving a user-triggered input to perform an action on the data, generating a second action history that includes the plurality of actions from the first action history modified by the action corresponding to the user-triggered input,
    wherein the second action history is updated by,
        comparing the plurality of actions from the first action history to the plurality of actions in the second action history to identify a last matching action between the first action history and the second action history;
        disabling a subset of actions in the first action history that are listed after the last matching action;
        inserting, subsequent to the last matching action in the second action history, the action corresponding to the user-triggered input;
        enabling a subset of actions in the second action history that are listed after the last matching action to generate an updated second action history; and
    displaying the updated second action history in a graphical user interface, the updated second action history including one or more indications for each of the actions associated with inserting the action corresponding to the user-triggered input.

16. The computer program product of claim 15, wherein enabling a subset of actions in the second action history includes:
    analyzing all actions in the second action history in a time-consecutive order from newest action to oldest action to verify the subset of actions in the second action history;
    in response to validating that the subset of actions, when performed in combination, generate valid data, marking the subset of actions in the second action history as active;
    re-applying the subset of actions in the second action history to the data; and
    displaying the second action history in the user interface with updated graphical information, the updated graphical information indicating that the subset of actions are to be performed on the data.

17. The computer program product of claim 15, wherein the instructions further comprise generating modified data based on the updated second action history, the generation of the modified data including:
    automatically producing a data flow graph according to the updated second action history;
    executing the data flow graph, wherein the data flow graph retrieves the data and the updated second action history; and
    displaying the modified data to the user in the graphical user interface.

18. The computer program product of claim 15, wherein disabling a subset of actions in the first action history that are listed subsequent to the last matching action includes:
    applying an inactive label to at least one action in the subset of actions in the first action history; and
    removing changes executed on data associated with the at least one action.

19. The computer program product of claim 15, wherein the instructions further comprise,
    in response to determining that the user-triggered input to perform an action on the data includes a deletion request, removing from the first action history, at least one action based on the user-triggered input and reverting the data to a prior version of the data.

20. The computer program product of claim 15, wherein the instructions further comprise:
    in response to determining that the user-triggered input to perform an action on the data includes a reorder request:
        generating an update to the second action history to modify a chronological position of at least one action in the second action history; and
        executing the second action history including the update to generate modified data according to the reorder request.

* * * * *